Patented June 17, 1947

2,422,411

UNITED STATES PATENT OFFICE 2,422,411

TAENIACIDAL MIXTURE

James Erwin Guthrie, Ashland, Ohio, assignor to Dr. Hess & Clark, Inc., Ashland, Ohio, a corporation of Ohio No Drawing. Application May 23, 1945, Serial No. 595,473

8 Claims. (Cl. 167—53.1)

The invention relates to a medicament for treatment of poultry for the removal of tapeworms, and has as an object the provision of a taeniacidal mixture by which improved results are secured.

My Patent 2,323,218, dated June 29, 1943, discloses and claims a tin salt of the group comprising stannous maleate, stannous fumarate and stannous butyrate as a taeniacide.

I have now discovered that a minor percentage of ferric arsenate when combined with a major portion of one of the substances disclosed in my former patent provides a marked increase in the efficiency of the medicament for elimination of *Raillietina cesticillus*, commonly referred to as tapeworms, from chickens.

It is found that ferric arsenate containing a trace of ferric arsenite is particularly effective for mixing with the tin salt. Best results have been secured when the ferric arsenite present in the arsenate comprised from 0.4 to 0.6 percent of the material.

To prepare ferric arsenate having the desired percentage of arsenite, technical grades of sodium arsenate and of ferric chloride are separately dissolved in water each in only enough water to effect solution. Sufficient quantities of each solution are then taken to provide equimolecular proportions of the dissolved materials and the measured quantities are mixed together. Ferric arsenate precipitates freely, is filtered out, washed and dried.

The thus prepared ferric arsenate is then analyzed to determine the percentage of arsenite present. When prepared as described from good technical grades of sodium arsenate and ferric chloride, the percentage of arsenite will usually be within the range stated. The probability of securing a suitable percentage of ferric arsenite in the final product is increased by demanding an analysis of the sodium arsenate when it is purchased and choosing a supply that shows a proper percentage for the purpose intended. Usually the ferric arsenite is found permissible or a little bit high. If it is higher than permissible the material is washed with water. The ferric arsenite being more soluble than ferric arsenate, the percentage of the former is readily reduced.

If the percentage is too low, another batch may be prepared with a too high percentage and the two batches may be mixed in the proper proportions.

A suitable dose for an adult chicken is .75 gram of the tin salt with .15 gram of the described ferric arsenate, the latter containing one-half of one percent of ferric arsenite. Using stannous maleate, which is the tin salt at present preferred for use with the arsenate, good results have been secured within the following ranges, namely: .75 gram stannous maleate, .15 gram ferric arsenate; .5 gram stannous maleate, .15 gram ferric arsenate; .75 gram stannous maleate, .1 gram ferric arsenate; .75 gram stannous maleate, .25 gram ferric arsenate; and 1 gram stannous maleate, with .15 to .25 gram ferric arsenate.

In general the proportion of stannous maleate to ferric arsenate should be between three and eight parts of the maleate to one part of the arsenate.

The medicament may be enclosed in capsules or compressed in tablets and administered orally. It may be given after a fast of from sixteen to eighteen hours and no food given for at least three hours after treatment, or it may be given from three to four hours after the bird has gone to roost, in which case the bird may be allowed to feed at the normal time on the following morning.

Careful comparative tests of the ingredients used separately and in combination, as above described, establishes the fact that the action of the ingredients is synergistic.

Minor changes of the proportion of parts, and in the quantity administered may be made within the scope of the following claims without departing from the spirit of the invention.

I claim:

1. A taeniacidal mixture comprising a minor portion of ferric arsenate and a major portion of a tin salt chosen from the group consisting of stannous maleate, stannous fumarate and stannous butyrate.

2. The mixture of claim 1 in which the ferric arsenate contains a trace of ferric arsenite.

3. A taeniacidal mixture comprising a major portion of stannous maleate and a minor portion of ferric arsenate.

4. The mixture of claim 3 in which the ferric arsenate contains a trace of ferric arsenite.

5. A taeniacidal mixture comprising from three to eight parts of stannous maleate and one part of ferric arsenate.

6. The mixture of claim 5 in which the ferric arsenate contains from .4 to .6 percent of ferric arsenite.

7. A taeniacidal mixture comprising substantially five parts of stannous maleate and substantially one part of ferric arsenate.

8. A taeniacidal mixture comprising substantially one part of iron-arsenic material comprising substantially 99.5% ferric arsenate and 0.5% of ferric arsenite and substantially five parts of stannous maleate.

JAMES E. GUTHRIE.

REFERENCES CITED

The following references are of record in the file of this patent:

UNITED STATES PATENTS

| Number | Name | Date |
|---|---|---|
| 2,323,218 | Guthrie | June 29, 1943 |

OTHER REFERENCES

Guthrie, Journal of the American Veterinary Medical Association, September 1940, pages 248 to 253.

U. S. Dispensatory (1943), 23rd ed., pages 1364, 1365.

Extra Pharmacopoeia, vol. 1, 22nd ed. (1941), page 214.